United States Patent [19]

Scott et al.

[11] Patent Number: 4,497,232

[45] Date of Patent: Feb. 5, 1985

[54] CUTTING TOOL WITH CUTTING TOOTH INSERT

[75] Inventors: Lewis A. Scott, Lake Oswego; Duane M. Gibson, Milwaukie; Arthur J. Woodfill, Portland, all of Oreg.

[73] Assignee: Omark Industries, Portland, Oreg.

[21] Appl. No.: 489,835

[22] Filed: Apr. 29, 1983

[51] Int. Cl.³ .................... B27B 33/12; B27B 33/14
[52] U.S. Cl. ........................................ 83/831; 83/845
[58] Field of Search .................. 83/845, 839, 831

[56] References Cited

U.S. PATENT DOCUMENTS

| 55,423 | 6/1866 | Lippincott | 83/845 |
|---|---|---|---|
| 75,733 | 3/1868 | Clemson | 83/845 |
| 292,809 | 2/1884 | Harris | 83/845 |
| 303,787 | 8/1884 | Arnold | 83/839 |
| 343,713 | 6/1886 | Kinney | 83/845 |
| 499,886 | 6/1893 | Kendall et al. | 83/845 |
| 2,372,534 | 3/1945 | Victor | 83/831 |
| 2,583,243 | 1/1952 | Tweedie | 83/831 |
| 3,288,180 | 11/1966 | McLean et al. | 83/845 |

*Primary Examiner*—Frank T. Yost
*Attorney, Agent, or Firm*—Robert L. Harrington

[57] ABSTRACT

A cutting tool having cutting teeth. The cutting teeth are formed on one end of inserts that are seated in slots provided in the body of the tool with the cutting teeth projected outwardly of the slots. The inserts are produced from a resilient material that is preset in a bowed configuration with the slots having substantially straight side walls. A relief opening is provided in the bottoms of the slots and the seated inserts are forced into an open, substantially straight position with a tail section that curls into the relief opening. Flanges provided on the inserts overlap the edges of one side wall of the slots to resist lateral displacement.

6 Claims, 6 Drawing Figures

CUTTING TOOL WITH CUTTING TOOTH INSERT

FIELD OF INVENTION

This invention relates to a cutting tool wherein the cutting teeth are provided by replacable inserts.

BACKGROUND OF INVENTION

The idea of providing a removable cutting tooth for a sawing tool was conceived many years ago. The forces imparted on the cutting tooth in a cutting operation are severe and there are few materials that can withstand these forces for any length of time. Furthermore, the cutting tooth is difficult to produce and that task is compounded if the cutting tooth has to be formed out of the cutting tool, e.g. formed in the periphery of a circular saw blade or from a cutter link in a saw chain. Thus numerous attempts have been made at producing cutting teeth inserts from material particularly suited for cutting. The inserts are mounted to the main body portion of the cutting tools which can then be produced from less critical materials.

A problem that has been very difficult to overcome in producing tools with inserts is securely but efficiently attaching the inserts to the tool. Many concepts have been developed but in recent years the known successful developments have relied on welding or brazing to join the inserts to the tool. The inserts however, are not readily removable and the process is expensive.

BRIEF DESCRIPTION OF THE INVENTION

The present invention achieves secure fastening without brazing or welding. In brief, a cutting tool is provided with a slot that is designed to accomodate an insert and the insert is produced from a resilient material, e.g. spring steel. The slot is generally straight and the cutter insert is bowed so that when forced into the slot, the resiliency of the insert frictionally grips the walls of the slot. The bottom of the slot is shaped to provide a relief opening for the extreme inner end of the cutter insert which curls into the relief opening and provides substantial increased gripping. The inserts are substantially wider than the tool width, and flanges on the inserts overlap the side edges of the slot. These flanges secure the insert against lateral forces.

A bowed cutter insert forced into a straight slot is not new as evidenced by U.S. Pat. No. 75,733 issued to Clemson on Mar. 24, 1868 and No. 499,886 issued to Kendall et al on June 20, 1893. The novelty of the present invention resides in the provision of the holding features whereby a cutting tooth insert can be readily inserted and removed and yet will be securely retained in the slot during use. A major benefit is that such an insert can be relatively easily removed and replaced when the cutting tooth portion thereof is worn.

DETAILED DESCRIPTION AND DRAWINGS

The invention and its advantages will more fully appreciated by reference to the following detailed description of the preferred embodiment and the drawings wherein.

Figure 1:
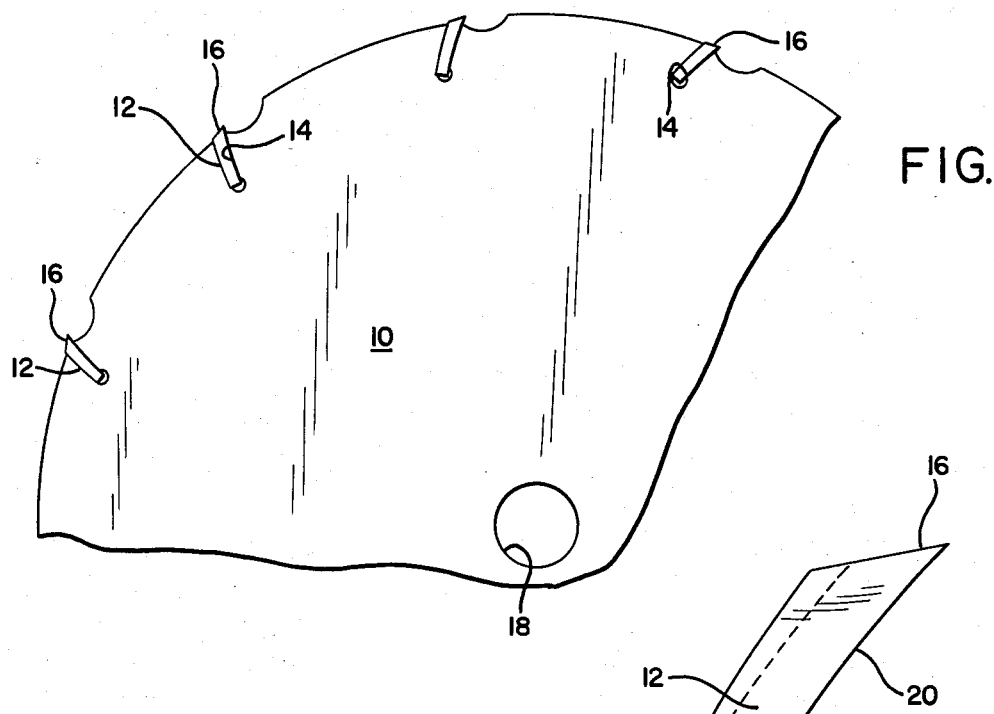
FIG. 1 is a circular saw blade incorporating the preferred embodiment of the invention.

Referring to FIG. 1 of the drawings, a circular saw blade 10 is illustrated including cutter inserts 12 seated in slots 14 as defined by side walls 24a and 24b. Portions of the inserts project beyond the periphery of the blade and form cutting teeth 16. A center opening 18 is provided for mounting the blade on the arbor of a saw machine (not illustrated).

Figure 2:
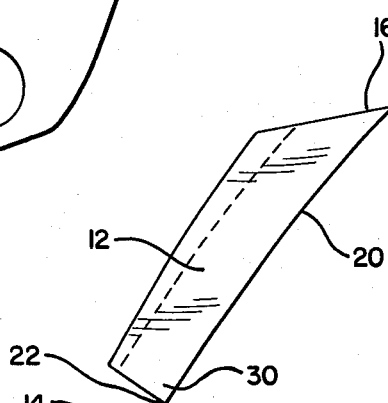
FIG. 2 is an enlarged segment of the saw blade of FIG. 1 showing a cutter insert prior to being seated in a receiving slot.
Figure 2:
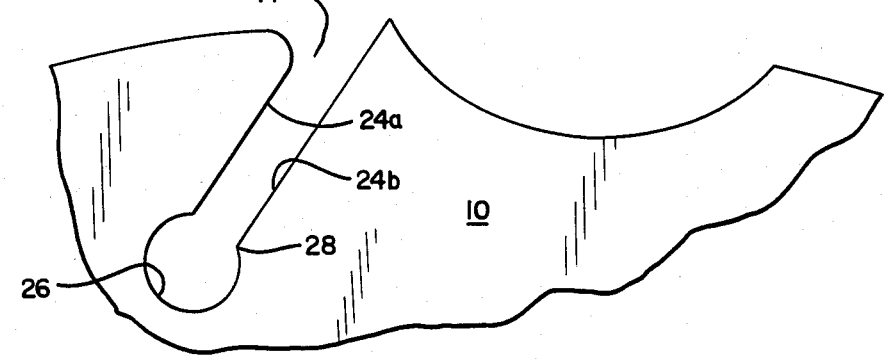
Figure 3:
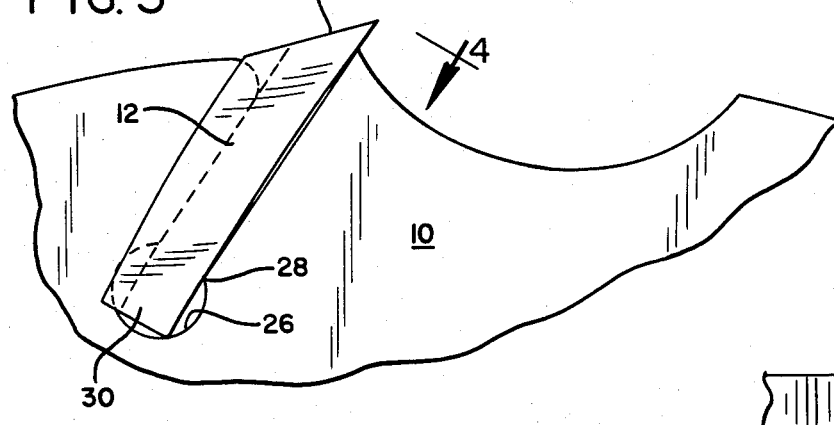
FIG. 3 is a view similar to FIG. 2 but showing the insert seated in the slot.
Figure 4:
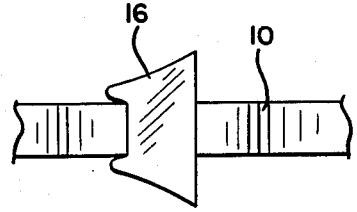
FIG. 4 is a top view taken on section lines 4—4 of FIG. 3.

FIG. 2 illustrates a section of saw blade 10 wherein a cutter insert is shown prior to being seated in slot 14. FIG. 3 illustrates the cutter insert in its fully seated position. As seen in FIG. 2, the cutter insert 12 is preset in a slightly bowed shape with a forwardly directed side 20 being concave from its inner edge 22 throughout the majority of its length. The material of the insert is resilient and functions like a tough leaf-spring, whereby it can be forced toward a straightened configuration but exerts constant pressure toward regaining its bowed shape. The slot 14 has substantially straight side walls 24a and 24b that are spaced apart throughout the majority of the length of the slot to accomodate the front to rear dimension of the insert when the insert is forced into its opened position.

The depth of the slot 14 is matched to the insert to provide for the desired extension of the cutting tooth 16 when the insert is fully seated as shown in FIG. 3. The bottom of the slot in side wall 24b is provided with a relief opening 26 that intersects with the straight section of the side wall to provide a gripping edge 28. (A similar relief opening is shown in side wall 24a for manufacturing convenience). As illustrated in FIG. 3, with the insert fully seated as shown, a tail section 30 of the insert is permitted to spring forward into the relief opening 26 and become partially curled around the gripping edge 28. With the insert seated as shown, the insert, in trying to regain its bowed shape, produces a continuously applied frictional, gripping pressure at the middle of the rear wall 24a, at the upper lip of the front wall 24b and particularly at the gripping edge 28 where removal requires that the tail section 30 of the insert be again straightened. It is the force that is required to straighten this tail section that inhibits removal and thus the gripping edge 28 may be rounded to a considerable degree and still provide the desired resistance to removal.

It is an objective of this invention to provide a mechanical locking cutter insert that can be easily seated in its receiving slot and easily removed, while providing secure attachment of the insert in the slot until removal is desired. Previously, where a bowed insert was forced into a straight slot, in order to achieve the necessary secure attachment, the slot had to be made so tight that in effect a press fit was achieved, or the spring loading of the bowed insert had to be made so great that both seating and removal of the insert was very difficult to achieve. With the present design, the gripping edge 28 provides a substantial resistance to inadvertent removal. This allows for sufficient reduction in the tightness of fit so that seating of the insert can be achieved relatively easily. Removal, although more difficult than seating, can be quite easily achieved by an appropriate tool.

Figure 5:
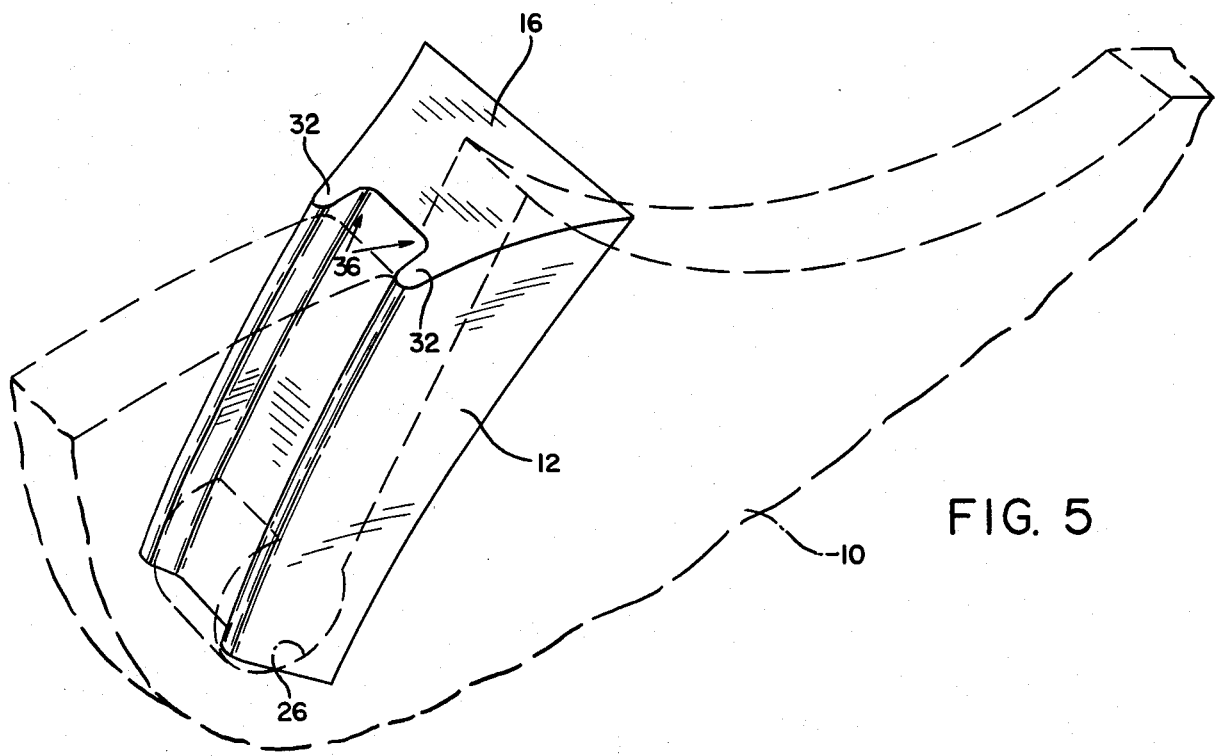
FIG. 5 is a perspective view of a cutter insert.

Reference is now made to the perspective view of a cutter insert in FIG. 5. As shown, the insert is formed with rearwardly extended flanges 32. These flanges are formed to produce a channel 36 that coincides with the width of blade 10. With the insert forced into slot 14, the flanges 32 overlap the side edges of the slot and secure the insert against lateral movement, e.g. as when the cutting forces generate a twisting of the insert.

ALTERNATE EMBODIMENT

Figure 6:
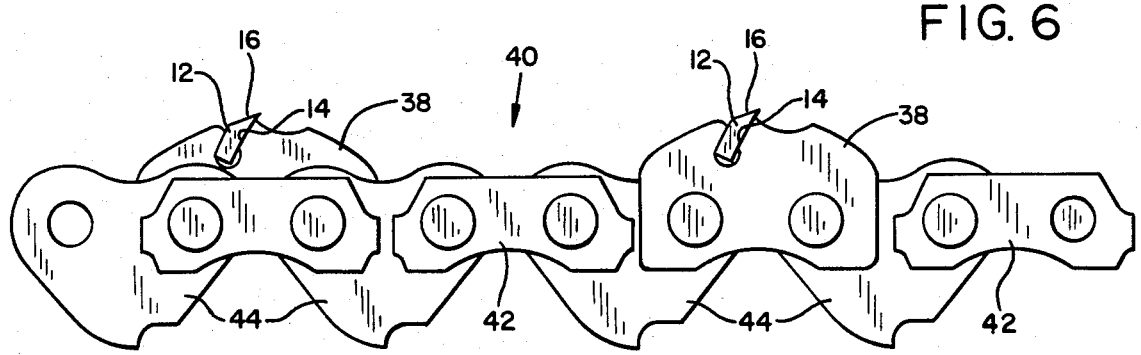
FIG. 6 is a saw chain incorporating the preferred embodiment of the invention.

Reference is now made to FIG. 6 wherein the invention is incorporated into a cutter link 38 of a saw chain 40. Side links 42 and drive links 44 are typical of saw chains as adapted for mounting onto a chain saw and will not be explained in detail. As described for the circular saw blade 10, the bowed insert 12 is forced into a straight slot 14. The slot 14 has a relief opening 26 and the tail section of the insert curls into the relief opening to be gripped by edge 28.

DETAILED SPECIFICATIONS

A circular saw blade of the invention has been produced as follows:

The disc material was formed from full hard roll tempered AISI 1025 steel and four inserts were formed from saw chain steel NS 800 R$^c$ 52-56 austempered. The disc was bladed to produce a thickness of 0.60 to 0.064 inch and a diameter of 7.20 to 7.25 inch. Four insert receiving slots were symmetrically formed, each at an angle to the radius of 30° and at a depth of 0.360 to 0.365 inch measured at the leading edge of the slot. The front to back dimension of the slot was 0.060 to 0.065 inch and the relief opening at the bottom was formed by a circle 0.097 to 0.100 inch diameter. The insert was formed with a front to back dimension measurement between the flanges 0.0570 to 0.0595 inch. The preset bow in the insert, prior to insertion, conformed to a 1.955 inch radius while the flanges on the back side of the insert defined a channel 0.065 inch wide. The flanges were slightly tapered from top to bottom having a maximum depth of 0.035 inch. The width of the insert was tapered down to a minimum of about 0.900 inch.

It will be appreciated that the above described embodiments of the invention are set forth as examples only. Others skilled in the art upon having benefit of this description, will conceive of numerous modifications thereto without departing from the inventive concept as defined in the claims appended hereto.

We claim:

1. A cutting tool comprising; a body portion having an insert-receiving slot formed therein with front and rear sidewalls, and a cutter insert having an inserted portion seated in the slot with a front to rear dimension that is substantially continuous throughout its length, and a cutting tooth portion extended outwardly of the slot, the front to rear dimension of the major portion of the slot being continuous and substantially equal to the front to rear dimension of the insert, and a relief opening in the bottom of the slot, said insert being preset and formed of a resilient material, and one of said slot and insert being curved relative to the other whereby forcing the insert into the slot requires a change in the preset configuration of the insert, and whereby full seating of the insert results in a tail section of the insert being spring biased into the relief opening.

2. A cutting tool as defined in claim 1 wherein the relief opening projects into the front side wall of the slot and a gripping edge is provided in the front side wall by the formation of said relief opening.

3. A cutting tool as defined in claim 1 wherein the slot is straight and the cutter insert is spring steel that is preset in a bowed configuration.

4. A cutting tool as defined in claim 1 wherein the insert extends laterally from the slot on both sides of the body portion, and flanges are provided in the laterally extended portions that overlap the edges of the rear side wall of the slot to inhibit lateral movement of the insert relative to the body portion.

5. A cutting tool as defined in claim 4 wherein the cutting tool is a disc-shaped circular saw blade and said insert-receiving slots are formed in the periphery of the disc thereof.

6. A cutting tool as defined in claim 4 wherein the cutting tool is a cutting link of a saw chain.

* * * * *